United States Patent
Schröder et al.

(10) Patent No.: US 9,669,865 B2
(45) Date of Patent: Jun. 6, 2017

(54) DOUBLE PINION STEERING GEAR WITH AN ELECTRIC MOTOR

(71) Applicant: THYSSENKRUPP PRESTA AG, Eschen (LI)

(72) Inventors: Anatoli Schröder, Ludwigsburg (DE); Kai Vohwinkel, Reichenbach (DE)

(73) Assignee: THYSSENKRUPP PRESTA AG, Eschen (LI)

( * ) Notice: Subject to any disclaimer, the term of this patent is extended or adjusted under 35 U.S.C. 154(b) by 0 days.

(21) Appl. No.: 14/899,874

(22) PCT Filed: Jun. 18, 2014

(86) PCT No.: PCT/EP2014/001653
§ 371 (c)(1),
(2) Date: Dec. 18, 2015

(87) PCT Pub. No.: WO2014/202215
PCT Pub. Date: Dec. 24, 2014

(65) Prior Publication Data
US 2016/0137219 A1 May 19, 2016

(30) Foreign Application Priority Data
Jun. 21, 2013 (DE) .......................... 10 2013 010 360

(51) Int. Cl.
*B62D 3/12* (2006.01)
*B62D 5/04* (2006.01)

(52) U.S. Cl.
CPC .............. *B62D 5/0421* (2013.01); *B62D 3/12* (2013.01); *B62D 5/0409* (2013.01); *B62D 5/0442* (2013.01); *B62D 5/0457* (2013.01)

(58) Field of Classification Search
CPC ........ B62D 5/042; B62D 3/12; B62D 5/0409; B62D 5/0442
(Continued)

(56) References Cited

U.S. PATENT DOCUMENTS 3,762,240 A    10/1973   Adams
3,965,757 A *   6/1976   Barrus .................... G21C 7/14
                                                               376/203
(Continued)

FOREIGN PATENT DOCUMENTS

DE               2223008 A1    11/1972
DE    10 2005 022 867 A1    12/2005
(Continued)

OTHER PUBLICATIONS

German Language International Search Report for International patent application No. PCT/EP2014/001653; mailing date Sep. 1, 2014.
(Continued)

*Primary Examiner* — Tony Winner
(74) *Attorney, Agent, or Firm* — thyssenkrupp North America, Inc.

(57) ABSTRACT

A steering gear mechanism for motor vehicles may include a steering system housing in which a toothed rack is mounted and displaceable along a longitudinal axis. The toothed rack may be connected to steerable wheels of a motor vehicle and configured to pivot the steerable wheels. The toothed rack can include a first toothed segment that meshes with a first pinion of a pinion shaft, with the pinion shaft being connectable to a steering wheel via an input shaft. The toothed rack may further include a second toothed segment that is situated opposite the first toothed segment with respect to the longitudinal axis and engages with a second pinion. Further, an electric motor can drive the first pinion in a first direction, which by way of direct or indirect coupling causes the second pinion to rotate in a second direction opposite the first direction. The electric motor may drive a gear mechanism shaft that surrounds the pinion shaft
(Continued)

and is connected to the pinion shaft by way of a gear mechanism.

7 Claims, 5 Drawing Sheets

(58) Field of Classification Search
USPC .................. 180/444; 74/422; 280/93.514
See application file for complete search history.

(56) References Cited

U.S. PATENT DOCUMENTS

| | | | | |
|---|---|---|---|---|
| 5,417,144 | A * | 5/1995 | Petterson | B26D 5/08 |
| | | | | 29/888.042 |
| 2004/0045387 | A1* | 3/2004 | Keller | B62D 3/12 |
| | | | | 74/422 |
| 2005/0257992 | A1* | 11/2005 | Shiino | B62D 5/04 |
| | | | | 180/444 |
| 2006/0278466 | A1* | 12/2006 | Cheng | B62D 5/04 |
| | | | | 180/444 |
| 2013/0113173 | A1 | 5/2013 | Bilmayer et al. | |
| 2016/0207565 | A1* | 7/2016 | Maier | B62D 5/0421 |

FOREIGN PATENT DOCUMENTS

| | | |
|---|---|---|
| DE | 10 2007 002 572 A1 | 12/2007 |
| DE | 10 2007 004 218 A1 | 9/2008 |
| DE | 10 2007 000 962 A1 | 4/2009 |
| DE | 10 2008 021 591 A1 | 11/2009 |
| DE | 10 2010 027 553 A1 | 1/2012 |
| EP | 2 216 233 A1 | 8/2010 |
| JP | S58110373 A | 6/1983 |
| WO | 2006/138209 A2 | 12/2006 |
| WO | 2012/010255 A1 | 1/2012 |

OTHER PUBLICATIONS

English translation of International Search Report for International patent application No. PCT/EP2014/001653; mailing date Sep. 1, 2014.
English translation of the abstract of EP 2 216 233 A1.
English translation of the abstract of DE 10 2007 002 572 A1.
English translation of the abstract of DE 10 2007 000 962 A1.
English translation of the abstract of DE 10 2007 004 218 A1.
English translation of the abstract of JP S58110373 A.
English translation of the abstract of DE 10 2008 021 591 A1.

* cited by examiner

DOUBLE PINION STEERING GEAR WITH AN ELECTRIC MOTOR

CROSS REFERENCE TO RELATED APPLICATIONS

This application is a U.S. National Stage Entry of International Patent Application Serial Number PCT/EP2014/001653, filed Jun. 18, 2014, which claims priority to German Patent Application No. DE 102013010360.6 filed Jun. 21, 2013, the entire contents all of which are incorporated herein by reference.

FIELD

The present disclosure relates to steering gear mechanisms for motor vehicles.

BACKGROUND

For large and heavy vehicles in the so-called medium-size category, in the luxury car category, for all-terrain vehicles and for light utility vehicles, a structural form of the electrically assisted steering gear mechanism for motor vehicles is preferred in which the assistance force is introduced into the toothed rack by way of a second toothing. Steering gear mechanisms are known in which the servo drive acts on the toothed rack by means of a second steering pinion and a second toothing. Steering gear mechanisms of this kind are described in laid-open specifications DE 10 2005 022 867 A1, DE 10 2007 004 218 A1 and WO 2006/138209 A2. Said steering gear mechanisms have a relatively large structural volume since the servo drive is provided separately adjacent to the engagement arrangement between the steering pinion and the toothed rack. In addition, the guidance of the toothed rack in the region of the steering pinion has to be kept free of play by means of a thrust piece. This bearing arrangement involves production costs and constitutes a possible source of noise in practice, this being undesirable.

DE 10 2010 027 553 A1 has disclosed a double-pinion steering gear mechanism in which the two steering pinions are arranged opposite one another on the toothed rack at an angle of 90° with respect to the toothed rack. The two steering pinions are in this case mechanically positively coupled, by means of spur gears or bevel gears, for rotation in opposite directions. Owing to the geometric arrangement of the pinions in relation to one another, it is possible for a cumbersome thrust piece of the form known to date to be dispensed with. At least one steering pinion is coupled to a servomotor which assists the steering action. The rotation of the steering shaft is in this case detected by a sensor. The disadvantage of the arrangement is that shortages in structural space arise on account of the position of the servo drive and of the sensor.

SUMMARY

It is therefore an object of the present invention to provide a steering gear mechanism which has compact dimensions and which nevertheless provides the steering assistance forces which are required for heavy motor vehicles.

According to some examples of the present disclosure, a steering gear mechanism is provided, in particular for motor vehicles, having a steering system housing in which a toothed rack is mounted in a longitudinally displaceable manner and is connected to steerable wheels for the purpose of pivoting said steerable wheels, wherein the toothed rack is provided with a first toothed segment which meshes with a first pinion of a pinion shaft, and wherein the pinion shaft is indirectly connected to a steering wheel by means of an input shaft, wherein the toothed rack has a second toothed segment which is situated opposite the first toothed segment in relation to the longitudinal axis of the toothed rack, and wherein a second pinion is provided which engages with the second toothed segment, wherein an electric motor is provided which indirectly drives the first pinion which is mechanically positively coupled to the second pinion for rotation in the opposite direction, in which steering gear mechanism the electric motor drives a gear mechanism shaft which surrounds the pinion shaft and which is connected to the pinion shaft by means of a gear mechanism. A particularly compact structural form is possible owing to this arrangement.

In one embodiment, a rotational angle sensor is provided on the input shaft and a rotational angle sensor is provided on the pinion shaft, and therefore the applied steering moment and the position of the rotor can be determined.

The gear mechanism is preferably a speed-reduction gear mechanism. The motor can therefore be of compact design with a high rotational speed and a low torque.

In a preferred embodiment, the electric motor drives the gear mechanism shaft by means of a belt drive or a gearwheel drive.

In this case, the gearwheel drive can advantageously be in the form of a bevel gear drive or a spur gear drive.

It is furthermore preferably provided that the toothed rack is arranged between the first pinion and the second pinion, wherein a plane which is spanned by the axes of rotation of the pinions intersects the longitudinal axis of the toothed rack at an angle of inclination of less than 90°. Owing to this offset arrangement of the pinions, structural space can be saved in the region of the pinions.

It is advantageous if the mechanical coupling of the two pinions is realized by means of gearwheels.

In addition, it is advantageous if the axes of rotation of the two pinions which are situated opposite one another are arranged at an acute angle in relation to one another. In this way, it is possible for the engagement between the pinion and the toothed rack to be adjusted without a thrust piece.

In this case, it is preferably provided that the toothed segments are arranged in planes which are inclined in relation to one another, correspondingly to the pinions which are arranged at an acute angle in relation to one another.

In an advantageous embodiment, that bearing of the second pinion which is remote from the drive has a bearing arrangement for adjusting the play of the engagement between the pinion and the toothed rack.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

Figure 1:
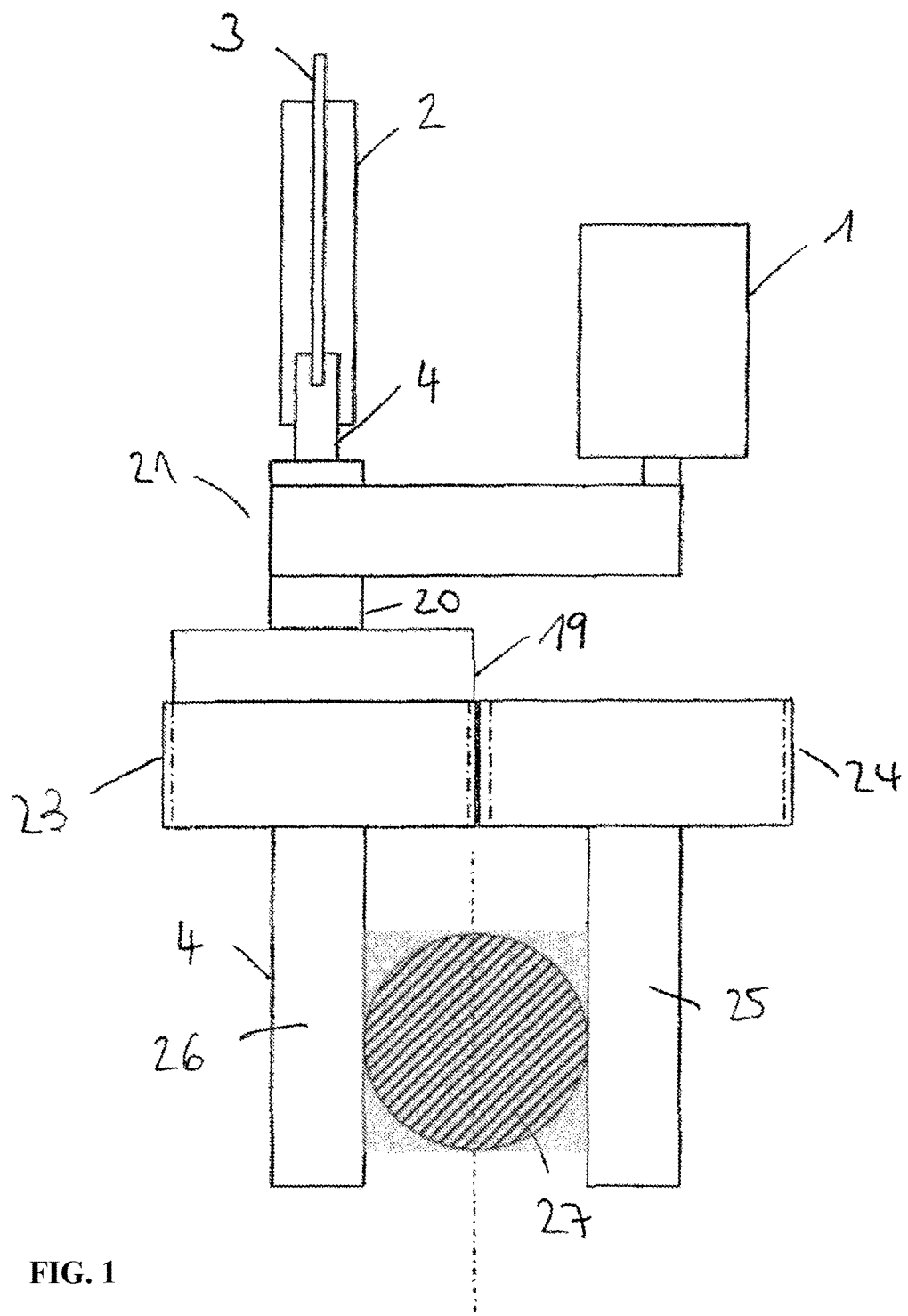
FIG. 1 is a schematic diagram of an example steering gear mechanism having an example double-pinion configuration and an example belt drive.
Figure 2:
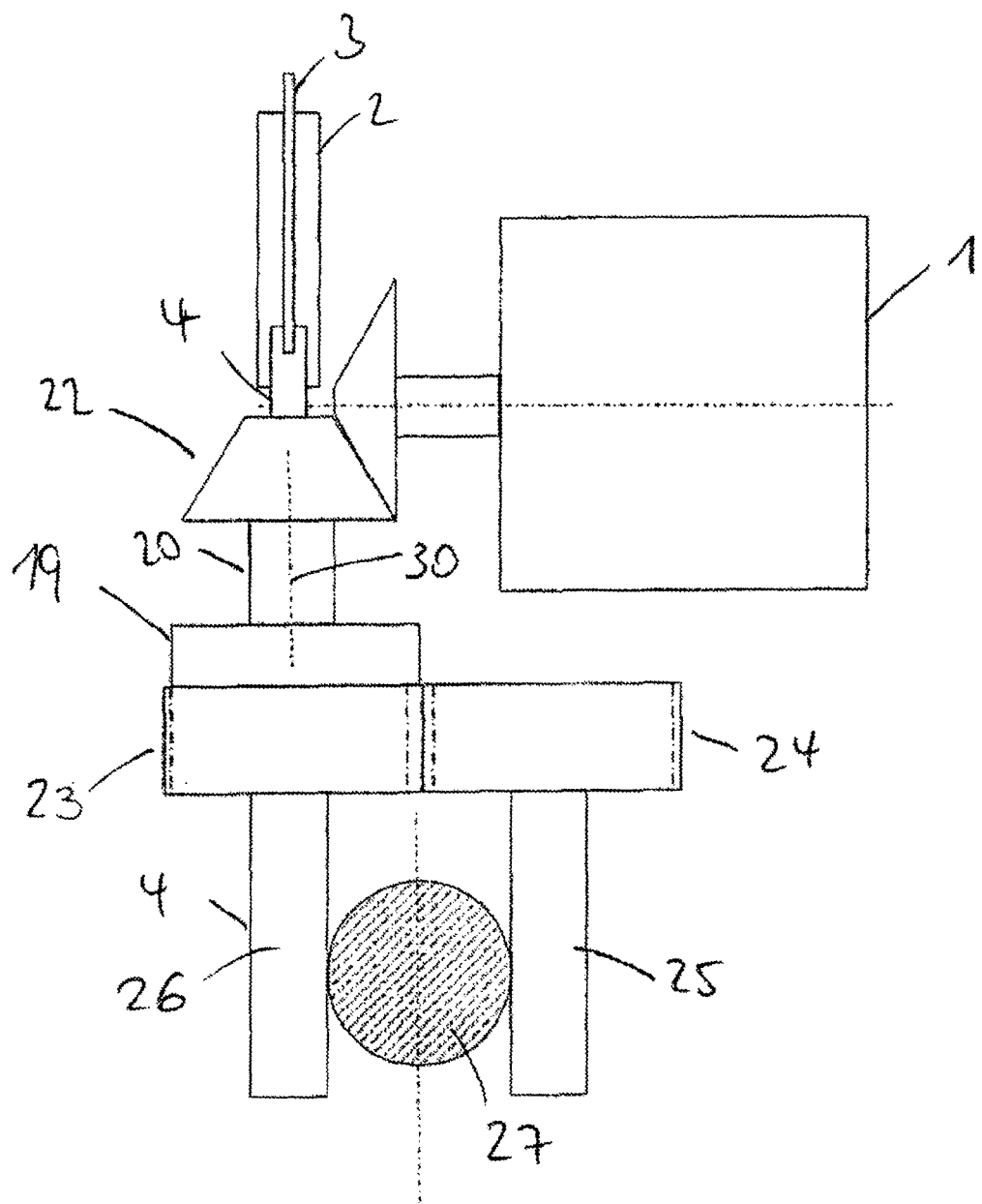
FIG. 2 is a schematic diagram of an example steering gear mechanism having an example double-pinion configuration and an example bevel gear drive.
Figure 3:
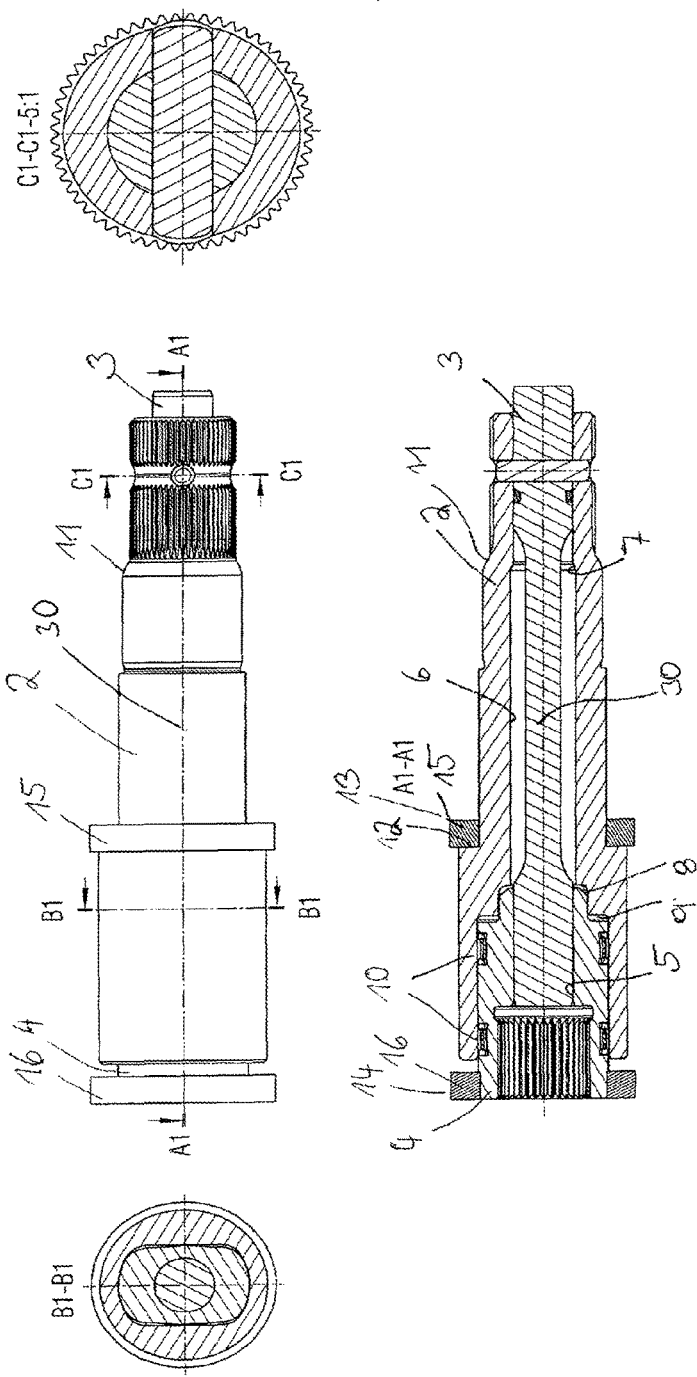
FIG. 3 is a side view of an example input shaft and an example pinion shaft, along with cross-sectional views taken across lines A1-A1, B1-B1, and C1-C1.

FIG. 1 and FIG. 2 schematically show the arrangement of an electric motor 1 as a servo drive of a steering gear mechanism. The electric motor 1 is arranged next to an input shaft 2 which is connected in a rotationally fixed manner to the steering shaft, not illustrated here, which is connected to the steering wheel. A torsion bar 3 which is known per se firstly connects the input shaft 2 to a pinion shaft 4 in an axial direction, so that said input shaft and pinion shaft have a defined position in relation to one another. Secondly, the torsion bar 3 effects a relative rotation between the input shaft 2 and the pinion shaft 4 depending on the steering wheel moment, which relative rotation is utilized for controlling the steering assistance action and the direction thereof. As shown in FIG. 3, the torsion bar 3 is pressed, at one end, into a circular, centered bore 5 in the pinion shaft 4 for this purpose. At the other end, said torsion bar is connected to the input shaft 2 by passing centrally through the input shaft 2 over the entire length and by said torsion bar and input shaft being drilled through transversely, and pinned, at the end. In this case, the torsion bar 3 is tapered in a middle section. In order to receive the torsion bar 3 and the pinion shaft 4, the input shaft 2 has a central recess 6 which passes through and has three shoulders 7, 8 and 9. At the end which is remote from the pinion the recess 6 has the first shoulder 7 in the region of the tapered portion of the torsion bar 3. Up to the end which is close to the pinion, the recess 6 is of circular-cylindrical form. The second shoulder 8 of the recess 6 serves as a collar for the pinion shaft 4 and is arranged at the end of the tapered portion of the torsion bar 3. In the region of the second shoulder 8, the recess 6, and the pinion shaft 4 received therein with play, are of oval-cylindrical configuration. The pinion shaft 4 can therefore be rotated through a particular angular range in the oval-cylindrical recess 6 until a stop serves as a mechanical driver. Said limitation serves to protect the torsion bar 3. The second shoulder 8 is adjoined by the third shoulder 9, in which the recess 6 is again of circular-cylindrical form and the pinion shaft 4 also has a circular cross section. In this case, the input shaft 2 surrounds the pinion shaft 4 with a small degree of play, wherein needle-roller bearings 10 on the pinion shaft 4 ensure that the input shaft 2 is mounted such that it can rotate about the pinion shaft 4. The input shaft 2 has, on the outer side, a first projection 11 and a second projection 12, wherein the first projection 11 is situated in the region of the first shoulder 7 of the recess 6.

Figure 4:
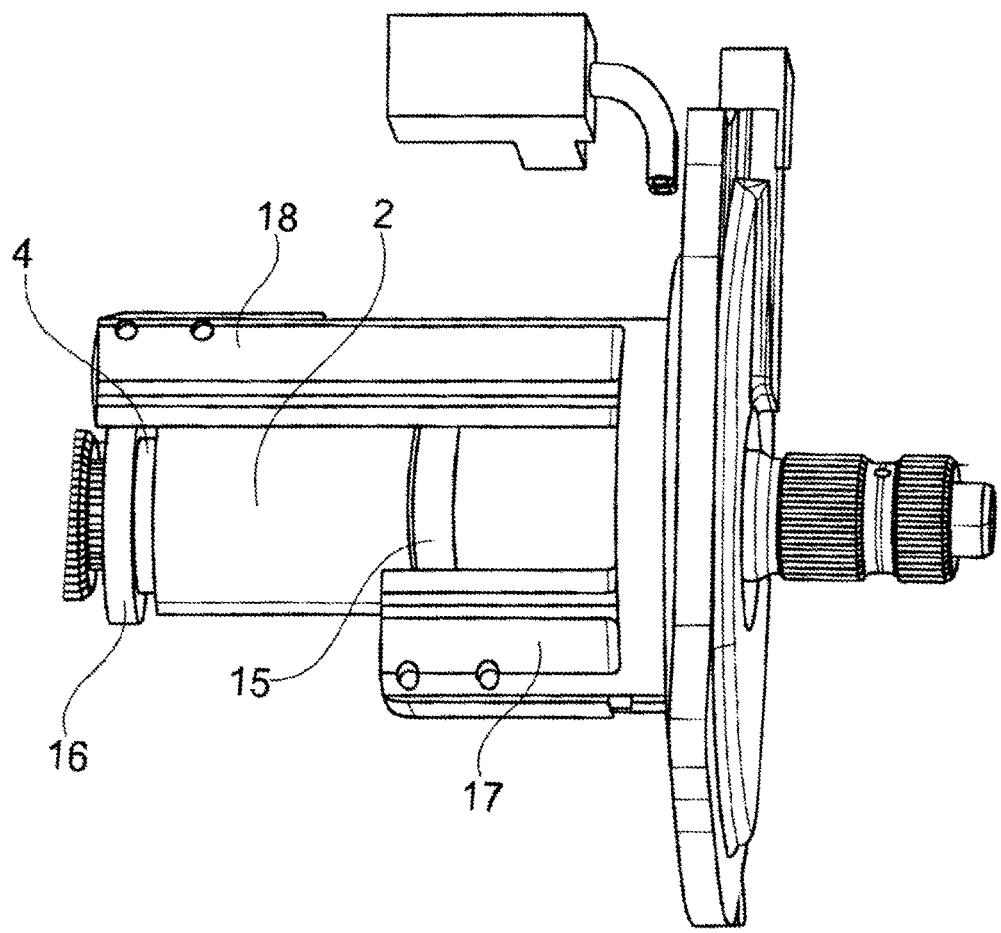
FIG. 4 is a perspective view of an example input shaft in a pre-assembled state, wherein the input shaft has example torque sensors and example encoder magnets.

The twisting of the torsion bar 3 is, as illustrated in FIG. 3 and FIG. 4, detected by means of two magnetic rotational angle sensors 13, 14. The rotational angle sensors 13, 14 each have a magnet ring 15, 16, as an encoder magnet, and a sensor element 17, 18. The encoder magnets 15, 16 are preferably fixed on the input shaft 2 and the pinion shaft 4 by means of an adhesive connection. The sensor element 17, 18 may be in the form of a Hall sensor or magnetoresistive sensor. Optical sensors composed of a light-emitting component and a light-sensitive component, or strain gauges, are also conceivable. A first encoder magnet 15 is arranged on the input shaft 2 so as to be in contact with the ring-shaped collar which is formed by the second projection 12 and so as to be situated in front of the pinion shaft 4, and a second encoder magnet 16 is arranged on the pinion shaft 4. The position of the magnet rings 15, 16 in relation to one another during twisting of the torsion bar 3 produces the torsion angle of the torsion bar 3 and the applied steering wheel moment is calculated from said torsion angle together with the known torsion spring constant of the torsion bar 3.

The electric motor 1 which is arranged next to the input shaft 2 has a rotor and a stator. In this case, the rotor is realized with a permanent magnet and the stationary stator comprises coils which are driven with a time delay by an electronic circuit in order to allow a rotating field which produces a torque on the permanently excited rotor to be generated. The rotor indirectly drives a gear mechanism 19 by means of a gear mechanism shaft 20 which is connected in a rotationally fixed manner. The rotor is preferably connected to the gear mechanism shaft 20 by means of a belt drive 21 (FIG. 1) or gearwheel drive 22 (FIG. 2). In this case, the gearwheel drive 22 can be, as in FIG. 1, in the form of a bevel gear drive or in the form of a spur gear drive, depending on the arrangement.

The gear mechanism shaft 20 is hollow and the pinion shaft 6 passes through said gear mechanism shaft with play. The gear mechanism 19 is coaxial and in the form of a speed-reduction gear mechanism, and therefore the output rotation speed of the gear mechanism shaft 20 of the gear mechanism 19 is reduced and, at the same time, the torque on the pinion shaft 6 which is connected to a driver disk of the gear mechanism 19 is increased.

Figure 5:
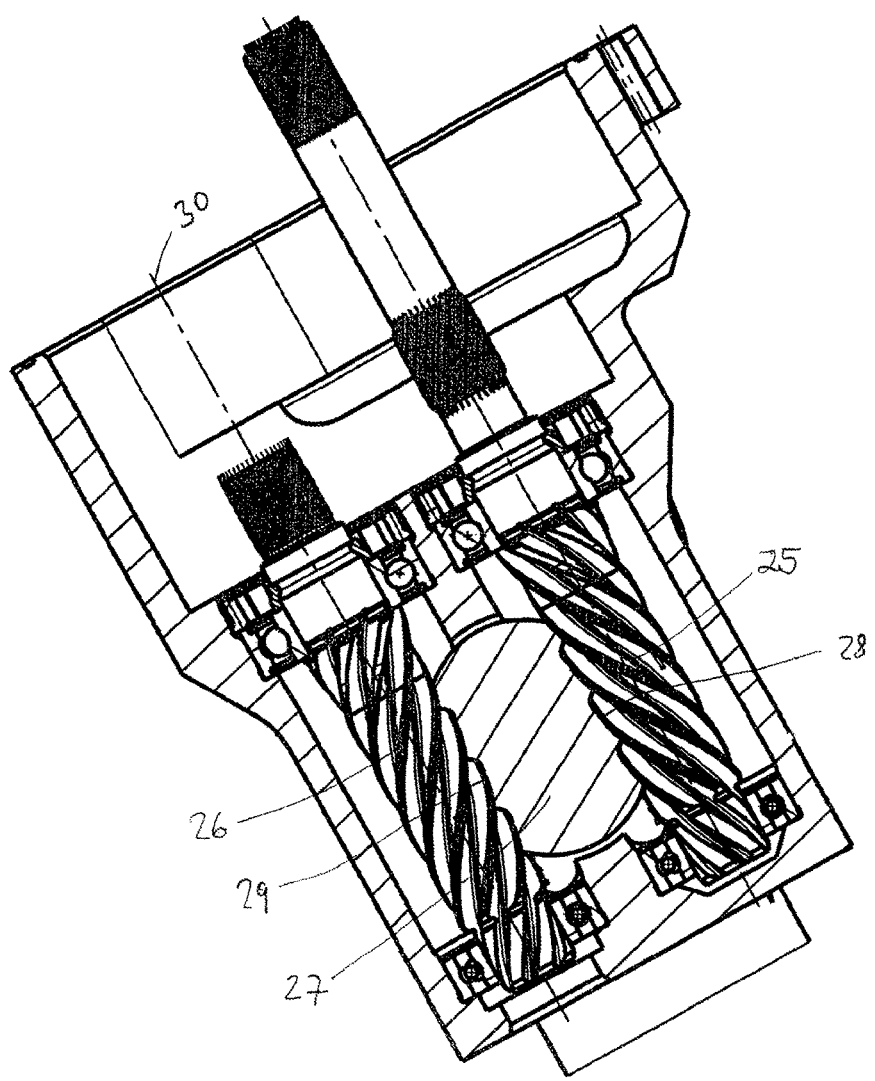
FIG. 5 is a sectional view showing an example pair of pinions that are engaged with an example toothed rack.

The driver disk, not illustrated here, has a concentric bearing seat for a first gearwheel 23. The first gearwheel 23 is connected in a rotationally fixed manner to the driver disk and to the pinion shaft 4 which passes through, and therefore the driver disk indirectly drives the pinion shaft 4. In addition, the first gearwheel 23 meshes with a second gearwheel 24, which surrounds a second pinion 25 at an end which is close to the drive in a rotationally fixed manner. The pinion shaft 4 has, at its end which is remote from the drive, a first pinion 26 which is mechanically positively coupled to the second pinion 25 by means of the two gearwheels 23, 24 at those ends of said pinions which are close to the drive, for rotation in opposite directions. FIG. 5 shows a detailed view of the pinions 25, 26, and the engagement of said pinions in a toothed rack 27. The pinions 25, 26, which are oriented parallel and are spaced apart, are in engagement with in each case one toothed rack segment 28, 29 on opposite sides on the toothed rack 27, wherein the toothed rack segments 28, 29 are situated opposite one another on the toothed rack 27 with respect to the longitudinal axis. The toothed rack 27 is mounted perpendicular to the longitudinal axis 30 of the input shaft 2 in a steering system housing.

In a further embodiment, the second pinion has, at the bearing which is remote from the drive, a bearing arrangement with two sleeves, wherein the outer sleeve forms a guide and the inner sleeve forms a sliding piece. The sliding piece is arranged such that it can be displaced along oblique guide surfaces, and therefore, during displacement of the sliding piece, the pinion can be advanced toward the engagement arrangement between the pinion and the toothed rack. For preloading and adjusting the play, a spring is provided between the sleeves and the closure cover, which is in the form of an adjustment screw.

The speed-reducing gear mechanism is particularly preferably in the form of a cycloid gear mechanism.

In another embodiment, it is conceivable for the coaxial gear mechanism to be in the form of a planetary gear mechanism or in the form of a strain wave gear mechanism.

Furthermore, in one embodiment, it is provided that the axes of rotation of the two pinions which are situated opposite one another are arranged at an acute angle in relation to one another, and the two toothed rack segments which are situated opposite one another on the toothed rack with respect to the longitudinal axis are arranged in planes which are inclined in relation to one another, because, in this way, freedom from play of the meshing engagements can be achieved by virtue of the toothed rack being preloaded into the enclosed angle.

In another embodiment, it is preferably provided that the pinions have an offset in relation to one another in the longitudinal direction of the toothed rack, and therefore structural space can be saved while maintaining the same coupling width of the pinions.

In the case of the steering gear mechanism according to the invention, if a steering movement occurs at the steering wheel, the torsion bar detects rotation of the steering shaft in relation to the pinion shaft. The signal which is triggered as a result of this controls the electric motor, which drives the pinion shaft by means of the gear mechanism which is driven by the rotor by means of a belt drive or gearwheel drive. The coaxial gear mechanism transmits the reduced output rotational speed of the gear mechanism shaft to the active first pinion. Owing to the positive mechanical coupling of the first pinion to the second pinion, the toothed rack is driven, from opposite sides, so as to perform a longitudinal displacement, this resulting in pivoting of the steered wheels. The steering assistance force which is generated by the servomotor is therefore introduced into the toothed rack by means of two pinions.

Owing to the construction of the torque sensor and the arrangement of the gear mechanism around the shaft, the servo drive is of highly compact design.

Furthermore, a thrust piece can be dispensed with owing to the arrangement of the pinions in relation to the toothed rack.

The steering gear mechanism according to the invention has preferred compact dimensions, and nevertheless provides the steering assistance forces which are required for heavy motor vehicles.

What is claimed is:

1. A steering gear mechanism for motor vehicles, the steering gear mechanism comprising:
   a steering system housing;
   a toothed rack that is mounted in the steering system housing and is displaceable along a longitudinal axis, the toothed rack being connected to steerable wheels of the motor vehicle and configured to pivot the steerable wheels, wherein the toothed rack comprises a first toothed segment that meshes with a first pinion of a pinion shaft, wherein the pinion shaft is connectable indirectly to a steering wheel via an input shaft, wherein the toothed rack comprises a second toothed segment that is positioned opposite the first toothed segment with respect to the longitudinal axis, wherein a second pinion engages with the second toothed segment; and
   an electric motor that indirectly drives the first pinion in a first direction and that indirectly drives the second pinion in a second direction opposite the first direction, wherein the electric motor drives a gear mechanism shaft that surrounds the pinion shaft and that is connected to the pinion shaft by a gear mechanism.

2. The steering gear mechanism of claim 1 further comprising:
   a first rotational angle sensor disposed along the input shaft; and
   a second rotational angle sensor disposed on the pinion shaft.

3. The steering gear mechanism of claim 1 wherein the gear mechanism is a speed-reduction gear mechanism.

4. The steering gear mechanism of claim 1 wherein the electric motor drives the gear mechanism shaft by way of a belt drive.

5. The steering gear mechanism of claim 1 wherein the electric motor drives the gear mechanism shaft by way of a gearwheel drive.

6. The steering gear mechanism of claim 1 further comprising gearwheels for mechanically coupling the first pinion to the second pinion.

7. A steering gear mechanism for motor vehicles, the steering gear mechanism comprising:
   a steering system housing;
   a toothed rack that is mounted in the steering system housing and is displaceable along a longitudinal axis, the toothed rack being connected to steerable wheels of the motor vehicle and configured to pivot the steerable wheels, wherein the toothed rack comprises a first toothed segment that meshes with a first pinion of a pinion shaft, wherein the pinion shaft is connected directly or indirectly to a steering wheel via an input shaft, wherein the toothed rack comprises a second toothed segment that is positioned opposite the first toothed segment with respect to the longitudinal axis, wherein a second pinion engages with the second toothed segment; and
   an electric motor that directly or indirectly drives the first pinion in a first direction and that directly or indirectly drives the second pinion in a second direction opposite the first direction, wherein the electric motor drives a gear mechanism shaft that surrounds the pinion shaft and that is connected to the pinion shaft by a gear mechanism.

* * * * *